(12) United States Patent
Samaniego et al.

(10) Patent No.: US 8,917,199 B2
(45) Date of Patent: Dec. 23, 2014

(54) SUBTERRANEAN IMAGE GENERATING DEVICE AND ASSOCIATED METHOD

(75) Inventors: Raymond Samaniego, Prosper, TX (US); Christopher M. Pilcher, Richardson, TX (US); John L. Tomich, Coppell, TX (US)

(73) Assignee: Raytheon Company, Waltham, MA (US)

( * ) Notice: Subject to any disclaimer, the term of this patent is extended or adjusted under 35 U.S.C. 154(b) by 675 days.

(21) Appl. No.: 13/086,107

(22) Filed: Apr. 13, 2011

(65) Prior Publication Data

US 2012/0262324 A1  Oct. 18, 2012

(51) Int. Cl.
G01S 13/00 (2006.01)
G01S 13/88 (2006.01)
G01S 13/90 (2006.01)
H01Q 1/32 (2006.01)
H01Q 21/06 (2006.01)

(52) U.S. Cl.
CPC ............... *G01S 13/885* (2013.01); *G01S 13/90* (2013.01); *H01Q 1/3258* (2013.01); *H01Q 21/064* (2013.01)
USPC .......................................................... 342/22

(58) Field of Classification Search
USPC ................................................... 342/22, 25
See application file for complete search history.

(56) References Cited

U.S. PATENT DOCUMENTS

| | | | |
|---|---|---|---|
| 3,775,765 A | 11/1973 | Di Piazza et al. | |
| 5,327,139 A * | 7/1994 | Johnson | 342/22 |
| 5,374,930 A * | 12/1994 | Schuermann | 342/42 |
| 5,673,050 A | 9/1997 | Moussally et al. | 342/22 |
| 5,761,331 A | 6/1998 | Clark, III | 382/131 |
| 5,835,054 A | 11/1998 | Warhus et al. | |
| 6,201,990 B1 | 3/2001 | Wexler et al. | 600/547 |
| 6,388,947 B1 | 5/2002 | Washbourne et al. | 367/73 |
| 6,700,526 B2 | 3/2004 | Witten | 342/22 |
| 6,745,070 B2 | 6/2004 | Wexler et al. | 600/547 |
| 6,831,590 B1 | 12/2004 | Steinway et al. | 342/22 |
| 6,833,795 B1 | 12/2004 | Johnson et al. | 340/853.5 |
| 6,838,671 B2 | 1/2005 | Compana et al. | 250/349 |
| 6,911,933 B1 | 6/2005 | Mutz et al. | 342/25 |
| 6,982,666 B2 | 1/2006 | Temes et al. | 342/22 |
| 6,998,854 B2 | 2/2006 | Yamagishi | 324/658 |
| 7,034,740 B2 | 4/2006 | Witten | 342/22 |
| 7,064,701 B2 | 6/2006 | Steinway et al. | 342/22 |
| 7,143,844 B2 | 12/2006 | Alft et al. | 175/45 |
| 7,148,836 B2 | 12/2006 | Romero et al. | 342/22 |
| 7,167,124 B2 | 1/2007 | Annan et al. | 342/22 |
| 7,310,060 B2 | 12/2007 | Stilwell et al. | 342/22 |

(Continued)

OTHER PUBLICATIONS

U.S. Appl. No. 13/089,720, filed Apr. 19, 2011, Notice of Allowance dated Aug. 7, 2014.

*Primary Examiner* — Timothy A Brainard
(74) *Attorney, Agent, or Firm* — Daly, Crowley, Mofford & Durkee, LLP

(57) ABSTRACT

In certain embodiments, a subterranean imaging apparatus comprises at least two receive channels configured on a land-based vehicle and a synthetic aperture radar (SAR) system. The at least two receive channels are operable to generate electrical signals according to electromagnetic radiation reflected from a subterranean target below a ground surface. The SAR system is operable to receive the electrical signals from the at least two receive channels, generate raw images from the received electrical signals, generate a weighting according to phase statistics of pixels in the raw images, and combine the raw images using the weighting to generate a refined image of the subterranean target.

17 Claims, 4 Drawing Sheets

(56) References Cited

U.S. PATENT DOCUMENTS

| | | | |
|---|---|---|---|
| 7,320,271 B2 | 1/2008 | Hintz | 89/1.13 |
| 7,333,045 B1 | 2/2008 | Aomori et al. | 342/22 |
| 7,362,260 B2 | 4/2008 | Cloutier et al. | 342/127 |
| 7,437,986 B2 | 10/2008 | Fuss et al. | 89/1.13 |
| 7,492,861 B2 | 2/2009 | Chen et al. | 378/57 |
| 7,511,654 B1 | 3/2009 | Goldman et al. | 342/22 |
| 7,518,542 B1 | 4/2009 | Steinway et al. | 342/22 |
| 7,561,096 B2 | 7/2009 | Hellsten | 342/22 |
| 7,637,196 B2 | 12/2009 | Thornton | 89/1.13 |
| 7,656,344 B2 | 2/2010 | Inaba | 342/70 |
| 7,677,672 B2 | 3/2010 | Hall et al. | 299/1.05 |
| 7,684,846 B2 | 3/2010 | Johnson et al. | 600/407 |
| 7,804,441 B1 | 9/2010 | DeChiaro, Jr. | 342/22 |
| 7,804,741 B1 | 9/2010 | Snow et al. | 367/127 |
| 7,813,223 B1 | 10/2010 | Snow et al. | 367/127 |
| 7,831,358 B2 | 11/2010 | Breed et al. | 701/45 |
| 7,841,982 B2 | 11/2010 | Johnson et al. | 600/437 |
| 7,848,645 B2 | 12/2010 | Healey et al. | 398/16 |
| 7,920,088 B2 | 4/2011 | Thompson et al. | 342/90 |
| 7,928,892 B2 | 4/2011 | Greegor et al. | 342/22 |
| 7,936,301 B2 | 5/2011 | Niedzwiecki | 342/146 |
| 8,044,797 B2 | 10/2011 | Brommer et al. | 340/539.32 |
| 8,044,999 B2 | 10/2011 | Mullen et al. | 348/67 |
| 8,054,212 B1 | 11/2011 | Holly et al. | 342/13 |
| 8,054,213 B2 | 11/2011 | Holly et al. | 342/22 |
| 8,289,201 B2 | 10/2012 | Holly et al. | |
| 2002/0122000 A1* | 9/2002 | Bradley et al. | 342/22 |
| 2002/0138019 A1 | 9/2002 | Wexler et al. | 600/547 |
| 2002/0175849 A1 | 11/2002 | Arndt et al. | 342/22 |
| 2003/0076254 A1 | 4/2003 | Witten | 342/22 |
| 2004/0155810 A1* | 8/2004 | Witten | 342/22 |
| 2004/0201584 A1 | 10/2004 | Lee | 345/420 |
| 2005/0057391 A1 | 3/2005 | Forsley et al. | 342/25 |
| 2005/0128125 A1* | 6/2005 | Li et al. | 342/22 |
| 2006/0197698 A1* | 9/2006 | Woodford et al. | 342/25 R |
| 2010/0052971 A1 | 3/2010 | Amarillas | |

* cited by examiner

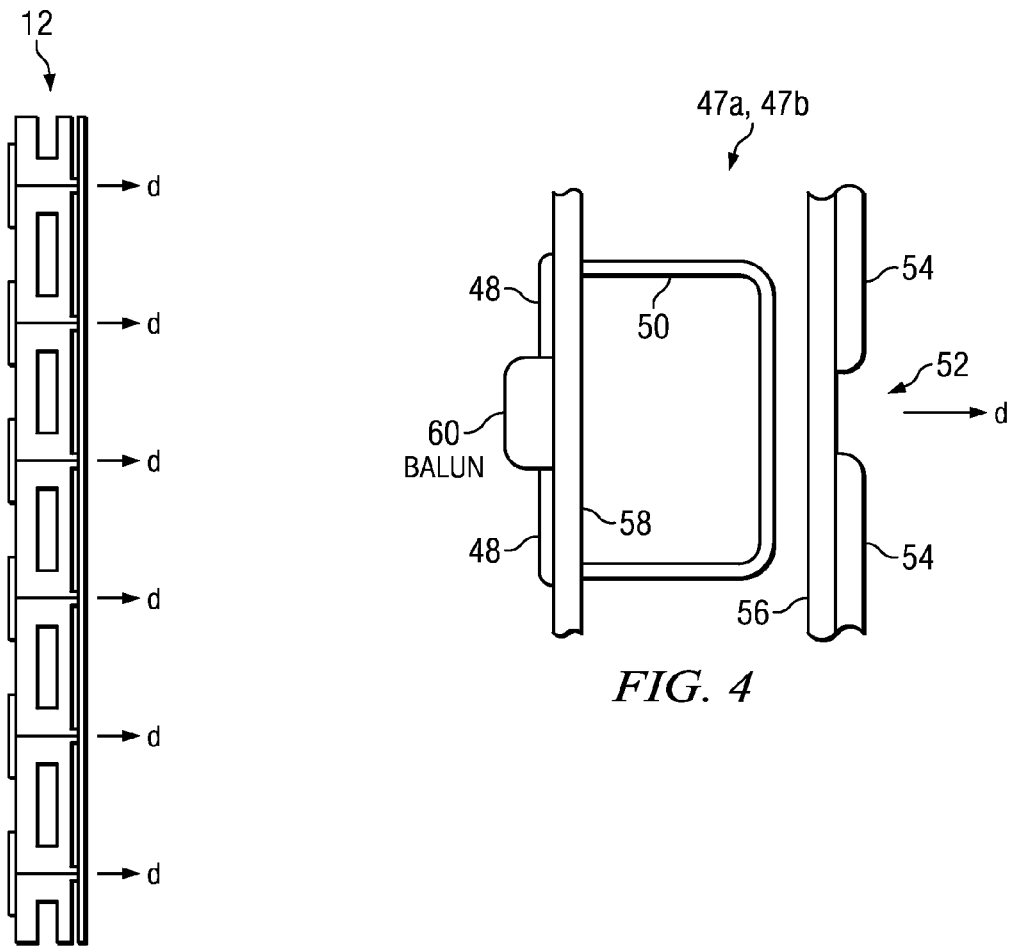
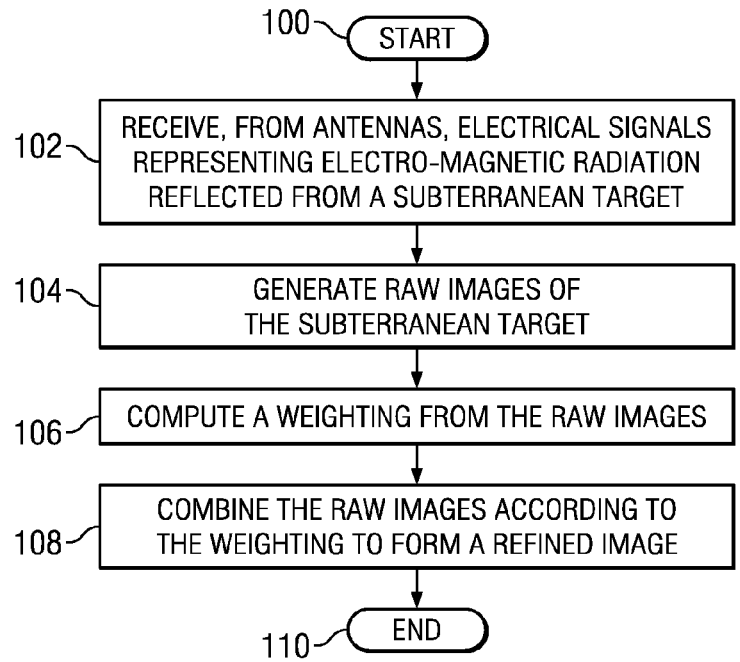

SUBTERRANEAN IMAGE GENERATING DEVICE AND ASSOCIATED METHOD

BACKGROUND

Radars detect remote objects by transmitting a beam of electromagnetic energy and subsequently measuring reflected electromagnetic energy from the objects. Radars may be used to detect the presence and/or motion of objects having electrical dielectric properties that differ from the properties of the ambient environment in which those objects are located. For example, radars may be used to detect weather-related phenomena (e.g. cloud cover or precipitation) or various topographical features in the Earth's atmosphere.

A synthetic aperture radar (SAR) is a particular type of radar that generates imagery by processing radio-frequency energy reflected from differing orientations and positions relative to the target. Imagery generated by the synthetic aperture radar may have benefits over imagery generated using other image-generating devices such as cameras in that imagery generated by the synthetic aperture radar is not usually hampered by precipitation, fog, or other atmospheric phenomena that may warp or block visible light.

SUMMARY

In certain embodiments, a subterranean imaging apparatus comprises at least two receive channels configured on a land-based vehicle and a synthetic aperture radar (SAR) system. The at least two receive channels are operable to generate electrical signals according to electromagnetic radiation reflected from a subterranean target below a ground surface. The SAR system is operable to receive the electrical signals from the at least two receive channels, generate raw images from the received electrical signals, generate a weighting according to phase statistics of pixels in the raw images, and combine the raw images using the weighting to generate a refined image of the subterranean target.

Certain embodiments of the present disclosure may provide one or more technical advantages. For example, certain embodiments may be particularly useful in a military context for detecting various subterranean features, such as enemy communication lines, hidden caches, land mines, or other subterranean entities. Imagery generated by SARs has conventionally been relegated to use with atmospheric targets in which the propagation medium for electromagnetic radiation is air. In many cases, air has served as a suitable medium due to its electromagnetic characteristics, which may remain relatively constant over time and space.

Generating images of subterranean targets, however, has been relatively more difficult to achieve due to several factors, including the relatively short penetration depth of electromagnetic radiation in the ground and/or the relatively complex nature of the subterranean matrix from which images may be generated. For example, subterranean features may include differing features, such as asphalt and buried objects, and/or various combinations of soil types, such as sand, loam, silt, and clay. These features may affect propagation aspects of electromagnetic radiation and/or form conductive discontinuities that obscure images that may otherwise be obtained from targets of interest.

Certain embodiments of the subterranean image generating apparatus may be configured on any suitable land-based vehicle, such as an automobile, truck, or tank for detection of subterranean targets (e.g., land mines) in the pathway of the vehicle. Thus, vehicles configured with the subterranean image generating apparatus may detect the presence of land mines or other suitable objects such that the detected objects may be avoided or otherwise acted upon (e.g., in the case of land mines,) defeated prior to their detonation. Also, vehicles configured with the subterranean image generating device may be used to 'sweep' an area to secure or rid the area of the potentially damaging effects of land mines or other hazardous subterranean targets.

Certain embodiments of the present disclosure may provide some, all, or none of these advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of embodiments of the present disclosure and the features and advantages thereof, reference is made to the following description taken in conjunction with the accompanying drawings, in which:

FIGS. 3A and 3B illustrate an example of the antenna array of FIG. 1;

FIG. 4 illustrates an example radiating element of the antenna array of FIGS. 3A and 3B; and FIG. 5 illustrates an example method for generating imagery of subterranean targets.

DESCRIPTION OF EXAMPLE EMBODIMENTS

Figure 1A:
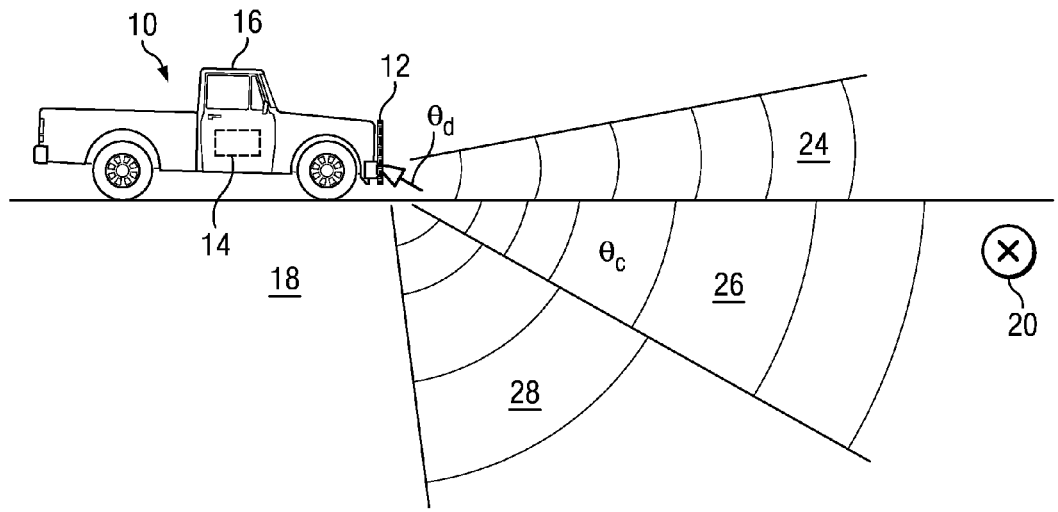
FIGS. 1A and 1B illustrate an example subterranean image generating device, according to certain embodiments of the present disclosure.
Figure 1B:
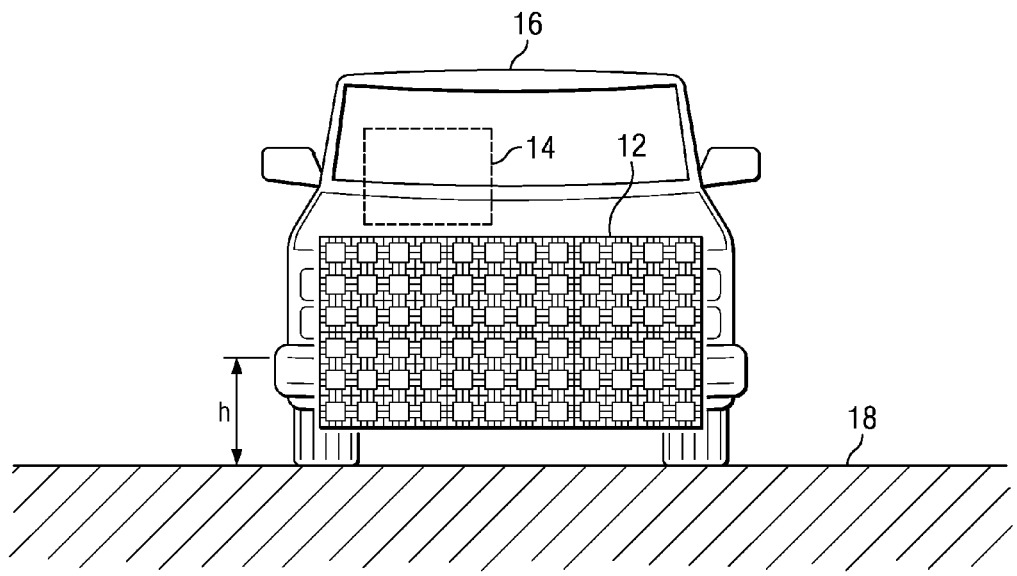

FIGS. 1A and 1B illustrate an example subterranean image generating device 10 according to certain embodiments of the present disclosure. Subterranean image generating device 10 includes an antenna array 12 coupled to a SAR system 14. Antenna array 12 and SAR system 14 are configured on a land-based vehicle 16 such that antenna array 12 may be moved generally horizontally in relative close proximity to ground 18 over which vehicle 16 moves. As will be described in detail below, antenna array 12 and SAR system 14 may generate imagery of and/or detect the presence of targets 20 disposed in ground 18 proximate vehicle 16 during movement of vehicle 16.

Certain embodiments of the present disclosure may provide one or more technical advantages. For example, certain embodiments may be particularly useful in a military context for detecting various subterranean features, such as enemy communication lines, hidden caches, land mines, or other subterranean entities. Imagery generated by SARs has conventionally been relegated to use with atmospheric targets in which the propagation medium for electromagnetic radiation is air. In many cases, air has served as a suitable medium due to its electromagnetic characteristics, which may remain relatively constant over time and space.

Generating images of subterranean targets, however, has been relatively more difficult to achieve due to several factors, including the relatively short penetration depth of electromagnetic radiation in ground and/or the relatively complex nature of the subterranean matrix from which images may be generated. For example, subterranean features may include differing features, such as asphalt and buried objects, and/or various combinations of soil types, such as sand, loam, silt, and clay. These features may affect propagation aspects of electromagnetic radiation and/or form conductive discontinuities that obscure images that may otherwise be obtained from targets 20 of interest.

Certain embodiments of subterranean image generating device 10 may be configured on any suitable land-based vehicle such as an automobile, truck, or tank for detection of subterranean land mines in the pathway (or other surrounding area) of vehicle 16. Thus, vehicles 16 configured with subterranean image generating device 10 may detect the presence of land mines or other suitable objects such that the detected objects may be avoided or otherwise acted upon (e.g., in the case of land mines,) defeated prior to their detonation. Also, vehicles 16 configured with subterranean image generating device 10 may be used to 'sweep' an area to secure or rid the area of the potentially damaging effects of land mines or other hazardous subterranean targets.

Antenna array 12 transmits electromagnetic radiation into ground 18 at a depression angle $\theta_d$ and receives electromagnetic radiation reflected from ground 18. Features in ground 18 typically have electrical and magnetic characteristics that vary from one feature to another and with the soil in which those features are buried such that the surfaces of those features form electrical discontinuities from which electromagnetic radiation may be reflected. SAR system 14 processes electrical signals received from antenna array 12 to generate imagery of subterranean targets 20 in ground 18 and/or to detect the presence of targets 20 in ground 18.

The depression angle $\theta_d$ of antenna array 12 generally refers to a downward pointing angle of the boresight direction of antenna array 12 below the horizontal plane of ground 18. At particular values of depression angle $\theta_d$ and height h of antenna from ground 18, antenna array 12 may generate electromagnetic radiation that may be generally categorized as air waves 24, lateral waves 26, and ground waves 28.

Ground waves 28 are generally characterized according to the propagation of electromagnetic radiation through a continuous, partially conductive medium that attenuates at distances relative to the intrinsic penetration depth of the electromagnetic radiation.

Air waves 24 may be characterized according to conventional propagation effects of electromagnetic radiation traveling through the air at close proximities to ground 18.

Lateral waves 26 comprise a particular type of electromagnetic radiation having characteristics that are generally distinct from air waves 24 or ground waves 28. Lateral waves 26 are bounded by the surface of ground 18 and by a critical angle $\theta c$ defining an interface between ground waves 28 and lateral waves 26. In many respects, lateral waves 26 are considered to be caused by the refraction of air waves 24 into ground 18 at or below the critical angle $\theta_c$. Thus, lateral waves 26 may be propagated at distances from antenna array 12 sufficient for detecting targets 20 during movement of vehicle 16 over ground 18.

In certain embodiments, antenna array 12 is approximately six feet wide by approximately thirty-six inches high, with each of its radiating elements (e.g., radiating elements 47, described below with reference to FIGS. 3A and 3B) being approximately six inches by six inches. In one example, the bottom of antenna array 12 is separated from ground 18 by approximately six inches. It should be understood that these dimensions and other details are provided for example purposes only and should not be used to limit the present disclosure. Antenna array 12 and its elements may have any suitable dimensions and any suitable relationship with vehicle 16 and ground 18, according to particular needs.

Vehicle 16 moves antenna array 12 and SAR system 14 over ground 18 or another type horizontal surface for which subterranean (or other subsurface) imagery may be desired. Vehicle 16 may include any suitable type of vehicle. For example, vehicle 16 may be a truck, a sedan, an armored personnel vehicle, a tank, or any other suitable type of land-based vehicle.

In certain embodiments, the height h of antenna array 12 above ground 18 may be maintained at or below $\frac{1}{10}$ of its radiating wavelength to generate lateral waves 26 sufficient for detecting targets 20 and/or generating subterranean imagery. Thus, antenna array 12 may be configured on a lower portion of vehicle 16, such as its front bumper, which may provide a sufficient height h and a generally unobscured angle of view toward ground 18 for acquisition of imagery.

In operation, subterranean image generating device 10 emits electromagnetic radiation in the form of pulses through antenna array 12 and receives reflected electromagnetic radiation from antenna array 12 while vehicle 16 moves over ground 18. The received electromagnetic radiation is back-projected to create raw images for each transmit/receive unit pair. Backprojection generally refers to a technique for creating images from a set of multiple projection profiles. The resulting raw images may reduce or eliminate effects of interference caused by air waves 24, ground waves 28, or other forms of clutter by dividing it into multiple image pixels. Each raw image of subterranean targets 20 may have a relatively good level of resolution.

Figure 2:
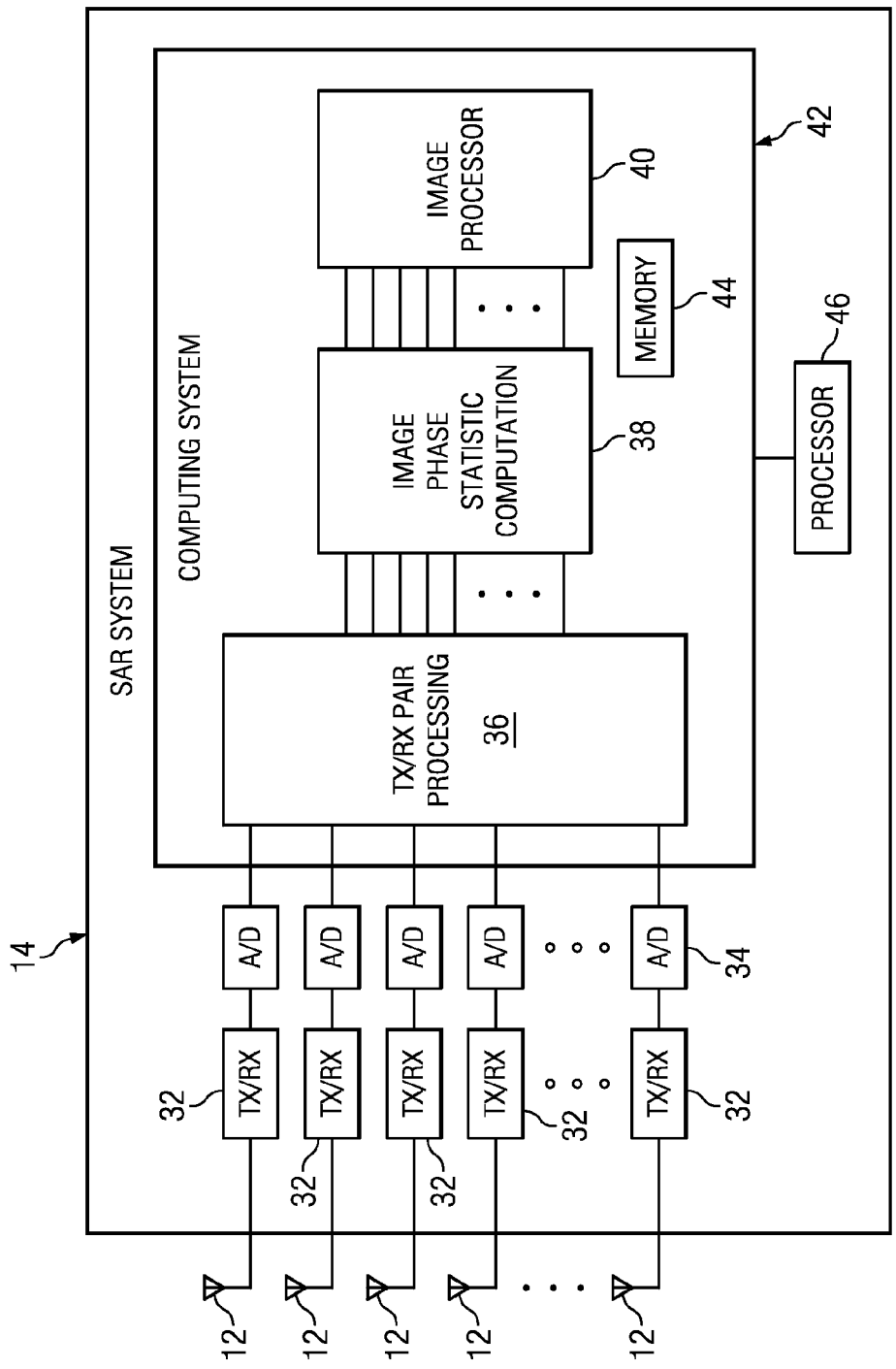
FIG. 2 illustrates several example elements of the subterranean image generating device of FIG. 1.

FIG. 2 illustrates several example elements of subterranean image generating device 10 of FIG. 1. Subterranean image generating device 10 may include antenna array 12 and SAR system 14. Although particular components of device 10 are described and those components are illustrated and described as having a particular arrangement and performing particular functions, the present disclosure contemplates device 10 including any suitable components and those components having any suitable arrangement and performing any suitable functions according to particular needs.

Antenna array 12 may be configured to transmit and receive electromagnetic radiation at any desired frequency that forms lateral waves 26 with sufficient penetration depth for detecting subterranean targets 20. In certain embodiments, antenna array 12 may be responsive to electromagnetic radiation at frequencies ranging from 0.1 Gigahertz to 2.0 Gigahertz. Additionally or alternatively, antenna array 12 may be responsive to frequencies less than 0.1 Gigahertz and/or greater than 2.0 Gigahertz. Electromagnetic radiation within the frequency range of 0.1 Gigahertz to 2.0 Gigahertz may provide sufficient penetration into ground 18 for detecting subterranean targets 20.

SAR system 14 may include an array of transmitter receiver units 32, one or more analog to digital (A/D) circuits 34, transmit/receive pair processing block 36, an image phase statistic computation block 38, and an image processor 40. Transmit/receive pair processing block 36, image phase statistic computation block 38, and image processor 40 may be part of a computing system 42 that includes a memory 44 and processor 46. SAR system 14 may include an array of transmitter receiver units 32, one or more analog to digital (A/D) circuits 34, transmit/receive pair processing block 36, an image phase statistic computation block 38, and an image processor 40 may be implemented using any suitable combination of hardware, firmware, and software.

In certain embodiments, the array of transmitter receiver units 32 may step through multiple frequencies within the frequency range of antenna array 12. For example, the array of transmitter receiver units 32 may transmit pulses from 0.1 to 2.0 Gigahertz in 100 Megahertz steps. Acquisition of reflected lateral waves at differing frequencies may yield additional information about various characteristics of targets 20 due to the differing penetration depths of lateral waves 26 at corresponding differing frequencies. For example, particular targets 20 in ground 18 may exhibit resonances at certain frequencies that may be used by image processor 40 to detect the presence of those particular targets 20. As an example, the array of transmitter receiver units 32 may transmit these pulses at a rate such that transmit/receive pair data is processed at approximately every 4 to 6 inch (or other suitable distance) movement of vehicle 16.

In the illustrated example, transmit/receive pair processing block 36 is coupled to the array of transmitter receiver units 32 (e.g., via corresponding A/D circuits 34) and to image phase statistics computation block 38. Transmit/receive pair processing block 36 may create raw backprojected images that may be focused by subsequent processing steps. As just one non-limiting example, transmitter receiver units 32 in the array of transmitter receiver units 32 may take turns transmitting, such that one unit 32 is transmitting while all other units 32 receive. As a more particular example, if SAR system 14 includes N transmitter receiver units 32, then in certain embodiments N×(N−1) backprojected images may be formed. After each transmitter receiver unit 32 in the array of transmitter receiver units 32 has experienced an opportunity to transmit, then in certain embodiments vehicle 16 moves a suitable distance.

A/D circuits 34 convert analog electrical signals received from corresponding antennas of antenna array 12 into a digital format suitable for use by image processor 40. Image processor 40 uses the phase statistics computed by image phase statistic computation block 38 to focus the raw backprojected images computed by transmit/receive pair processing block 36 into an enhanced image of subterranean targets 20. For example, image processor 40 may use the phase statistics computed by image phase statistic computation block 38 to focus the raw backprojected images computed by transmit/receive pair processing block 36 into a single enhanced image of subterranean targets 20.

Image phase statistic computation block 38 may compute statistics describing the phase at the pixels of raw backprojected images computed by transmit/receive pair processing block 36. Image processor 40 may receive the pixel phase summary statistics from image phase statistic computation block 38 and generate a weighting that may be applied across some or all of the raw backprojected images for a given pixel to create an enhanced image (e.g., a "final" focused image). Examples of pixel phase summary statistics that may be used with certain embodiments of the present disclosure include the mean and standard deviation of the amplitude and phase of the image pixels. The present disclosure contemplates using any suitable combination of types of weighting, including one or both of a fine and coarse filtering process.

As just one example, the backprojected images may be filtered using a correlation weighting technique to reduce noise. In certain embodiments, image processor 40 may use the generated pixel phase summary statics to create a weighting that attenuates interference from sidelobes and noise. As just one example, the weighting may be a function of the standard deviation of the image pixel phase and may allocate less weight to those pixels with a large standard deviation.

In certain embodiments, the weighting technique may reduce the effects of clutter to provide enhanced imagery and/or detection of subterranean targets 20. That is, the weighting technique may provide enhanced detection of targets 20 or generation of imagery from received signals by suppressing incoherent sidelobe information from extraneous features in ground 18 and/or reflected electromagnetic radiation from air waves 24 and/or ground waves 28. Ground 18 may include any suitable combination of complex elements, such as differing soil types, topical features (e.g., asphalt, concrete, and/or grass), and buried objects of varying size and levels of electrical conductivity. Each of these elements may contribute to noise that obscures the detection of and/or imagery for certain subterranean targets 20. In general, the weighting technique filters the raw image pixel phase received from transmit/receive pair processing block 36 such that the noisy effects caused by these complex features may be reduced or eliminated.

In certain embodiments, image processor 40 may compare the magnitude response with one or more specified threshold values to trigger an alarm or other alerting mechanism to indicate the presence of a particular target 20. In certain other embodiments, image processor 40 may apply differing weighting values over multiple acquisition cycles to generate imagery of subterranean features in ground 18.

Transmit/receive pair processing block 36, image processor 40, image phase statistic computation block 38, and may be part of computing system 42. Computing system 42 may include memory 44 and processor 46. Memory 44 may store instructions that can be executed by processor 46, as well as any other suitable information. Computing system 42 may include any suitable numbers and types of memory 44 and processors 46. A processor as described herein may include one or more microprocessors, controllers, or any other suitable computing devices or resources and may work, either alone or with other components of subterranean image generating device 10, to provide a portion or all of the functionality of subterranean image generating device 10 described herein. Memory 44 as described herein may take the form of volatile and/or non-volatile memory including, without limitation, magnetic media, optical media, random access memory (RAM), read-only memory (ROM), removable media, or any other suitable memory component. A portion or all of memory 44 may be remote from computing system 42, if appropriate.

Computing system 42 may include, transmit/receive pair processing block 36, image phase statistic computation block 38, and image processor 40, which may be implemented in any suitable combination of hardware, firmware, and software. Additionally, transmit/receive pair processing block 36, image phase statistic computation block 38 and image processor 40 may be implemented in a single location or in a distributed fashion (e.g., such that certain functions described with respect to image processor 40 are provided on a system other than computing system 42).

Embodiments of transmit/receive pair processing block 36, image phase statistic computation block 38, and image processor 40 may include logic contained within a medium. Logic may include hardware, software, and/or other logic. The medium in which the logic is encoded may include a tangible medium. The logic may perform operations when executed by processor 46. Certain logic may include a computer program, software, computer executable instructions, and/or instructions capable being executed by computing system 42. The logic may also be embedded within any other suitable medium without departing from the scope of the disclosure.

The components of computing system 42 may be implemented using one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device.

Components of subterranean image generating device 10 may be communicatively coupled with other computing systems via a network. The network facilitates wireless or wireline communication, and may communicate, for example, IP packets, Frame Relay frames, Asynchronous Transfer Mode (ATM) cells, voice, video, data, and other suitable information between network addresses. The network may include one or more LANs, radio access networks (RANs), metropolitan area networks (MANs), WANs, all or a portion of the global computer network known as the Internet, and/or any other communication system or systems at one or more locations.

In certain embodiments, subterranean image generating device 10 may implement a range gating technique in which reflected electromagnetic radiation is filtered according to a specified level of latency from the transmission of incidental electromagnetic radiation by the array of transmitter receiver units 32. For example, a target 20 of interest may be presumed to be approximately 10 feet from antenna array 12. Thus, electromagnetic radiation received by antenna array 12 may be filtered according to the propagation speed of the electromagnetic radiation through a round trip distance of (2*10) feet or 20 feet of distance. The range gating technique may be used to filter clutter that would otherwise originate from other extraneous features outside the desired physical range of target 20 from antenna array 12.

Figure 3A:
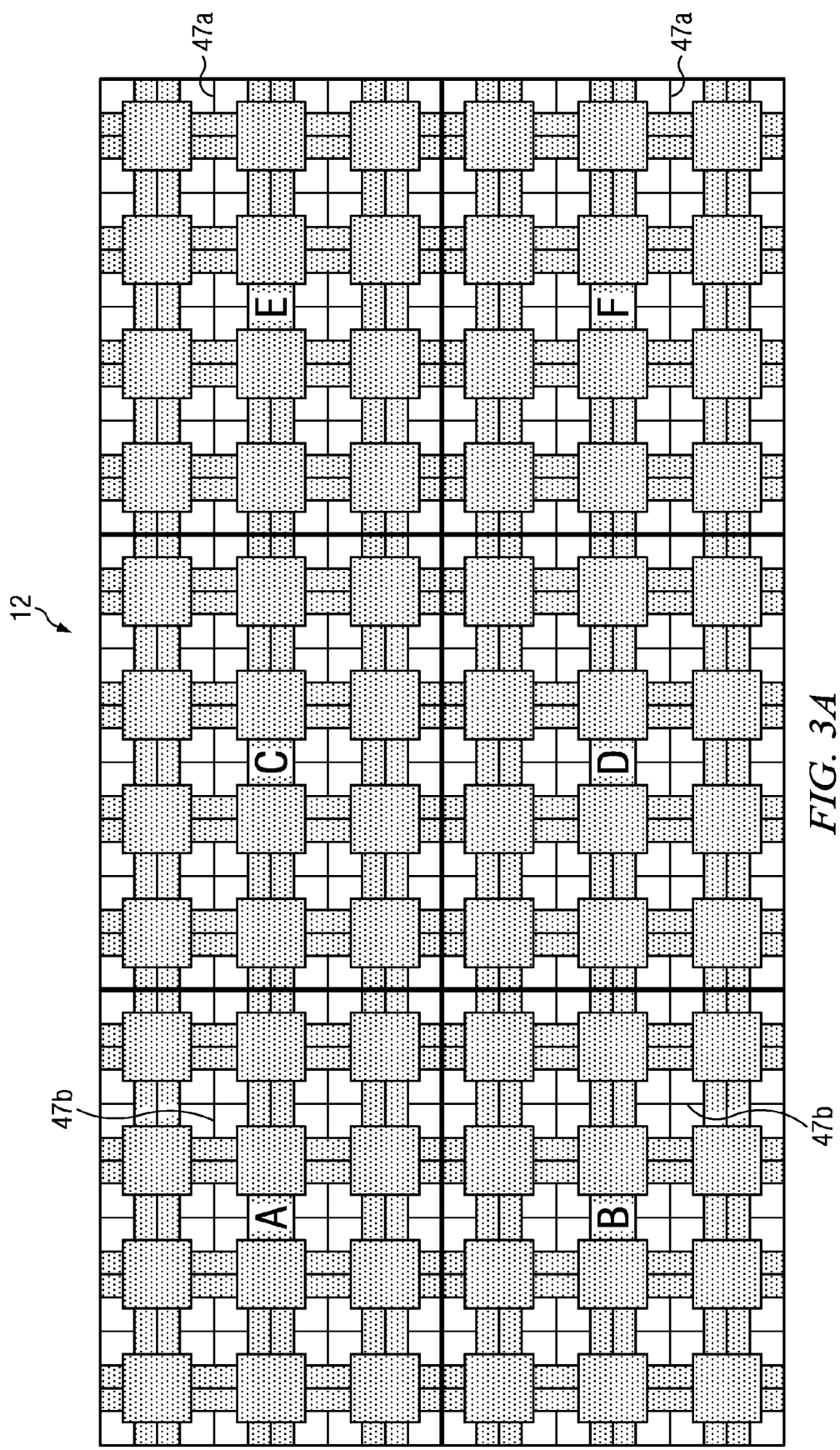

FIGS. 3A and 3B illustrate an example of antenna array 12 of FIG. 1. Antenna array 12 includes multiple vertical radiating elements 47a and multiple horizontal radiating elements 47b arranged in an m×n configuration. When excited by an electrical signal, radiating elements 47a and 47b emit electromagnetic radiation in a boresight direction d away from antenna array 12. Conversely, radiating elements 47a and 47b may receive electromagnetic radiation along boresight direction d and generate electrical signals according to the received electromagnetic radiation. The resulting transmit and receive beam generated by antenna array 12 may be directed in differing orientations relative to the orientation of antenna array 12 by adjusting the phase and/or amplitude of signals transmitted or received from individual radiating elements 47a and 47b.

In the particular embodiment shown, antenna array 12 includes thirty-six vertical radiating elements 47a and thirty-six horizontal radiating elements 47b arranged in a nine by four matrix configuration. In certain embodiments, antenna array 12 may include any quantity of radiating elements 47a and 47b arranged in any suitable m×n configuration. In certain embodiments, antenna array 12 may include seventy-two vertical radiating elements 47a and seventy-two horizontal radiating elements 47b arranged in a twelve by six matrix configuration. An antenna array 12 of this type may have approximately six-inch spacing between adjacent radiating elements 47a and 47b to generate and receive electromagnetic radiation within the previously cited frequency range, and to yield an overall size of six feet wide by three feet high.

Certain embodiments of antenna array 12 may provide an advantage in that lateral arrangement of multiple radiating elements 47a and 47b may provide azimuth diversity, while the vertical arrangement of multiple radiating elements 47a and 47b may provide elevation diversity. In this manner, antenna array 12 may provide improved azimuth diversity for determining the location of targets 20 with relatively good lateral and elevation resolution. Additionally, antenna array 12 including both vertical radiating elements 47a and horizontal radiating elements 47b may provide enhanced polarization diversity over other antenna arrays that only possess radiating elements of a single polarity.

In certain embodiments, subterranean image generating device 10 may implement a hopping transmit technique in which electromagnetic radiation is alternatively transmitted from a first subset of radiating elements 47a and 47b while the reflected electromagnetic radiation is received from other radiating elements 47a and 47b.

For example, the array of transmitter receiver units 32 may transmit electromagnetic radiation from a subset of vertical radiating elements 47a disposed on the left side of antenna array 12 while receiving reflected electromagnetic radiation from another subset of vertical radiating elements 47a disposed on the right side of antenna array 12. During the next pulse, the array of transmitter receiver units 32 may transmit electromagnetic radiation from the subset of horizontal radiating elements 47b disposed on the left side of antenna array 12 while receiving reflected electromagnetic radiation from the subset of horizontal radiating elements 47b disposed on the right side of antenna array 12.

During the next pulse, the array of transmitter receiver units 32 may transmit electromagnetic radiation from a subset of vertical radiating elements 47a disposed on the right side of antenna array 12 while receiving reflected electromagnetic radiation from another subset of vertical radiating elements 47a disposed on the left side of antenna array 12. During the next pulse, the array of transmitter receiver units 32 may transmit electromagnetic radiation from the subset of horizontal radiating elements 47b disposed on the right side of antenna array 12 while receiving reflected electromagnetic radiation from the subset of horizontal radiating elements 47b disposed on the left side of antenna array 12.

The previously described process may be repeated throughout acquisition of imagery of subterranean targets 20 by subterranean image generating device 10.

FIG. 4 illustrates an example radiating element 47 of antenna array 12 of FIGS. 3A and 3B. Radiating element 47a or 47b includes a ground plane 48 and a feed line 50 that is arranged transversely to a slot 52 formed in a conductive layer 54. Conductive layer 54 may be disposed over a dielectric substrate 56. Similarly, ground plane 48 may be disposed over another dielectric substrate 58. When excited by an electrical signal, radiating element 47a or 47b may radiate an electromagnetic radiation outwardly along boresight direction d. Conversely, radiating element 47a or 47b may also receive electromagnetic radiation opposite to boresight direction d.

Feed line 50 is electrically coupled to a balun 60 so that feed line 50 may be driven by an unbalanced line, such as co-axial cable or other similar feed structure. Feed line 50 may be spaced between ground plane 48 and conductive layer 54 such that the impedance of feed line 50 matched to that of balun and free space (377 ohms) over the range of frequencies cited above. Certain embodiments using an array of radiating elements 47a and 47b may be provided with a depth of approximately 2 to 3 inches in depth when operated within the previously cited frequency range.

Only one radiating element 47a or 47b having a particular polarity is shown for clarity. Other radiating elements 47b or 47a having an orthogonal polarity may be similar in design and construction to the radiating element 47a or 47b shown.

Radiating elements 47a and 47b of antenna array 12 may be embodied in other specific forms. For example, radiating elements 47a and 47b may include horn antennas or flared-notch antennas that are arranged side-by-side in an m×n configuration.

In certain embodiments, each antenna array 12 may be configured with a resistive element to reduce the effective quality factor (Q-factor) of its associated antenna array 12. Some antennas may inherently possess a Q-factor high enough to exhibit ringing at certain frequencies. If not compensated for, this ringing may cause false resonances that may unduly introduce noise into subterranean image generating device 10. Thus, resistive elements may be configured on each antenna array 12 to reduce the effects of ringing that would otherwise impair or reduce the quality of generated imagery.

In certain embodiments, subterranean image generating device 10 may implement an auto detection technique in which characteristics of received electromagnetic radiation is compared with signatures of certain types of targets 20 stored in memory 44. Certain types of subterranean targets 20 such as land mines or other targets of interest may have physical features that cause electromagnetic radiation to reflect with certain characteristics. These characteristics may be stored in memory 44 as signatures such that image processor 40 may compare received electromagnetic radiation with any one of the stored signatures to detect the presence of the target 20. Signatures may include any characteristic of reflected electromagnetic radiation. For example, signatures may include resonance characteristics of the target 20 in which the target 20 may reflect electromagnetic radiation at Q-factors associated with the frequency of excitation. As another example, signatures may include brightness values associated with the reflectivity of the target 20 in various subterranean mediums, such as sand, silt, loam, or clay.

FIG. 5 illustrates an example method for generating imagery of subterranean targets 20. Although the example method is described with regard to a subterranean image generating device 10, the present disclosure contemplates a substantially similar method being performed with regard to other subterranean image generating devices that use SAR processing techniques. At step 100, the process is initiated.

At step 102, SAR system 14 receives electrical signals representing electromagnetic radiation reflected from a subterranean target 20. In certain embodiments, SAR system 14 may receive independent electrical signals from multiple antenna array 12 configured on vehicle 16, which may be, for example, an automobile, a truck, an armored personnel vehicle, a tank, or other land-based vehicle. The multiple antennas may be configured laterally with respect to one another on vehicle 16, in antenna array 12 for example. In certain embodiments, image processor 40 performs a transmitter hopping technique in which the electromagnetic radiation is alternatively transmitted from one antenna of antenna array 12 while the reflected electromagnetic radiation is received from the other antennas of antenna array 12. The lateral configuration of antennas of antenna array 12 and the transmitter hopping technique may provide azimuth diversity for improved lateral resolution of targets 20 in certain embodiments. Other embodiments could employ different configurations of transmit and receive antennas.

Certain embodiments use at least two receive channels. A receive channel may be an independent data source in this context and may include two or more antennas whose outputs are summed so that at least two independent looks at a scene are sensed. Independent looks are those such that the centers of the sensing elements are not collocated. Two receive channels may be used so that objects in the right and left sides of the image can be disambiguated. Multiple receive channels may be advantageous because a number of independent looks may provide lower variance phase summary statistics.

At step 104, SAR system 14 generates raw backprojected images of the target 20 from the received electrical signals. The raw images may be generated by combining multiple return signals at differing positions of antennas of antenna array 12 relative to target 20 in order to determine its position as well as the positions of other features in ground 18.

At step 106, SAR system 14 may generate a weighting to apply across the raw images derived from the phase statistics of each raw image pixel. As just one example, image processor 40 may generate the weighting as a correlation beam derived from a sum of the complex correlations of the receive channels. Pixels whose sum is small may be given a relatively smaller weighting than those whose sum is large. Small sums generally are indicative of noise or sidelobe interference.

At step 108, SAR system 14 sums the raw images using the weighting derived from the pixel phase statistics to generate a refined image of the target 20. The weighting may be such that those signals relatively coherent with a bright spot or feature in the raw images are magnified with a greater intensity relative to other signals having fewer coherencies. Extraneous features in ground 18 along with air waves 24 and ground waves 28 may form clutter that may be produced as noise in the raw image. A characteristic feature of this clutter, however, is the incoherent nature of electromagnetic radiation that it reflects relative to electromagnetic radiation reflected from targets 20 having distinct and localized structural characteristics. Thus, applying a weighting to the raw images may attenuate incoherent signals from the final focused image and therefore, remove noise for enhancing the quality of imagery generated by subterranean image generating device 10.

SAR system 14 may perform one or more additional techniques to further enhance the generated imagery. For example, SAR system 14 may perform a frequency stepping technique in which the array of transmitter receiver units 32 steps through a number of frequencies within a specified range of frequencies. Thus, return signals with differing frequencies may be compared with one another to determine additional information about the characteristics of target 20. As another example, SAR system 14 may apply a range gating technique in which reflected electromagnetic radiation is filtered according to its latency relative to a transmitted pulse. Thus, reflected signals not having a specified latency value may be filtered from the resulting image. As another example, SAR system 14 may perform an auto detection technique in which reflected signals are compared with features of certain types of targets stored in memory 44 to determine the type of subterranean target 20.

The previously described process continues during acquisition of imagery while vehicle 16 moves over the surface of ground 18. When acquisition of imagery is no longer needed or desired, the process ends at step 110.

Modifications, additions, or omissions may be made to the method without departing from the scope of the disclosure. The method may include more, fewer, or other acts. For example, SAR processor 46 may process return signals from multiple antenna array 12 that are configured above or below one another to provide enhanced elevation diversity. Thus, SAR system 14 may provide improved attenuation of noise that may originate from air waves 24 and/or ground waves 28 in certain embodiments.

Although the present invention has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A subterranean imaging apparatus comprising:
an antenna array comprising a plurality of elements, the plurality of elements configured on a land-bases vehicle; and
a synthetic aperture radar (SAR) system coupled to the antenna array and operable to:
receive electrical signals from the antenna array;
transmit electromagnetic radiation from a first subset of the plurality of elements to a subterranean target below a ground surface, wherein the antenna array has a depression angle selected to generate and transmit the electromagnetic radiation as air waves, lateral waves, and ground waves, wherein the lateral waves are bounded by the ground surface and a critical angle defined by an interface of the ground waves and the lateral waves;
receive electromagnetic radiation reflected from the subterranean target on a second subset of the plurality of elements having a polarity similar to the polarity of the first subset, the electromagnetic radiation having a frequency that ranges from 0.1 to 2.0 Gigahertz;
generate raw images from the electrical signals;
generate a weighting according to phase statistics of pixels in the raw images; and
combine the raw images using the weighting to generate a refined image of the subterranean target,
wherein the antenna array is operable to generate the electrical signals according to the electromagnetic radiation reflected from the subterranean target,
wherein the SAR system is operable to generate the raw images by combining a plurality of the electrical signals at differing positions of the antenna array relative to the subterranean target to determine a position of the subterranean target and positions of features other than the subterranean target below the ground surface.

2. A subterranean imaging apparatus comprising:
at least two receive channels configured on a land-based vehicle; and
a synthetic aperture radar (SAR) system operable to:
receive electrical signals from the at least two receive channels;
generate raw images from the electrical signals;
generate a weighting according to phase statistics of pixels in the raw images; and
combine the raw images using the weighting to generate a refined image of a subterranean target below a ground surface,
wherein the at least two receive channels are operable to generate the electrical signals according to electromagnetic radiation reflected from the subterranean target,
wherein an antenna array comprises the at least two receive channels and the antenna array has a depression angle selected to generate and transmit electromagnetic radiation as air waves, lateral waves, and ground waves, wherein the lateral waves are bounded by the ground surface and critical angle defined by an interface of the ground waves and the lateral waves,
wherein the SAR system is operable to generate the raw images by combining a plurality of the electrical signals at differing positions of the antenna array relative to the subterranean target to determine a position of the subterranean target and positions of features other than the subterranean target below the ground surface.

3. The subterranean imaging apparatus of claim 2, wherein the antenna array includes a plurality of elements.

4. The subterranean imaging apparatus of claim 3, wherein the SAR system is operable to:
transmit a first set of electromagnetic radiation from a first subset of the plurality of elements to the subterranean target; and
receive a first set of electromagnetic radiation reflected from the subterranean target on a second subset of the plurality of elements, the second subset of elements having a polarity similar to the first subset of elements; and
subsequently transmit a second set of electromagnetic radiation from the second subset of elements according to the first set of electromagnetic radiation reflected from the subterranean target; and
receive a second set of electromagnetic radiation reflected from the subterranean target on the first subset of elements.

5. The subterranean imaging apparatus of claim 2, wherein the electromagnetic radiation has a frequency that ranges from 0.1 to 2.0 GigaHertz.

6. The subterranean imaging apparatus of claim 5, wherein the SAR system is operable to:
alternatively transmit the electromagnetic radiation at multiple frequencies within the range of frequencies.

7. The subterranean imaging apparatus of claim 2, wherein the SAR system is operable to:
perform a range gating technique in which the reflected electromagnetic radiation is filtered according to a specified level of latency from transmission of the electromagnetic radiation.

8. The subterranean imaging apparatus of claim 2, further comprising a resistive element coupled between the at least two receive channels and the SAR system, the resistive element operable to reduce the effective Q-factor of the at least two receive channels.

9. The subterranean imaging apparatus of claim 2, wherein the SAR system is operable to:
determine a type of the subterranean target by comparing one or more characteristics of the received electromagnetic radiation with each of a plurality of signatures stored in a memory, each signature comprising the one or more characteristics associated with the type of the subterranean target.

10. A subterranean imaging method comprising:
receiving electrical signals from at least two receive channels configured on a land-based vehicle;
generating raw images from the electrical signals;
generating a weighting according to phase statistics of pixels in the raw images; and
combining the raw images using the weighting to generate a refined image of a subterranean target below a ground surface,
wherein the at least two receive channels are operable to generate the electrical signals according to electromagnetic radiation reflected from the subterranean target,
wherein an antenna array comprises the at least two receive channels and the antenna array has a depression angle selected to generate and transmit electromagnetic radiation as air waves, lateral waves, and ground waves, wherein the lateral waves are bounded by the ground surface and a critical angle defined by an interface of the ground waves and the lateral waves,
wherein a SAR system is operable to generate the raw images by combining a plurality of the electrical signals at differing positions of the antenna array relative to the subterranean target to determine a position of the subterranean target and positions of features other than the subterranean target below the ground surface.

11. The subterranean imaging method of claim 10, wherein receiving the electrical signals from the at least two receive channels comprises receiving the electrical signals from the antenna array, wherein the antenna array includes a plurality of elements.

12. The subterranean imaging method of claim 11, further comprising:
  transmitting a first set of electromagnetic radiation from a first subset of the plurality of elements to the subterranean target; and
  receive a first set of electromagnetic radiation reflected from the subterranean target on a second subset of the plurality of elements having a polarity similar to the polarity of the first subset of elements; and
  subsequently transmitting a second set of electromagnetic radiation from the second subset of elements according to the first set of electromagnetic radiation reflected from the subterranean target; and
  receiving a second set of electromagnetic radiation reflected from the subterranean target on the first subset of elements.

13. The subterranean imaging method of claim 10, wherein receiving the electrical signals comprises receiving the electrical signals at a frequency in the range of 0.1 to 2.0 GigaHertz.

14. The subterranean imaging method of claim 13, further comprising:
  transmitting electromagnetic radiation at multiple frequencies within the range of frequencies.

15. The subterranean imaging method of claim 10, further comprising:
  performing a range gating technique in which the reflected electromagnetic radiation is filtered according to a specified level of latency from transmission of the electromagnetic radiation.

16. The subterranean imaging method of claim 10, further comprising reducing the effective Q-factor of the at least two receive channels using a resistive element coupled between the at least two receive channels and the SAR system.

17. The subterranean imaging method of claim 10, further comprising:
  determining a type of the subterranean target by comparing one or more characteristics of the received electromagnetic radiation with each of a plurality of signatures stored in a memory, each signature comprising the one or more characteristics associated with the type of subterranean target.

* * * * *